H. WEBSTER.
CAR COUPLING.
No. 39,436.          Patented Aug. 4, 1863.
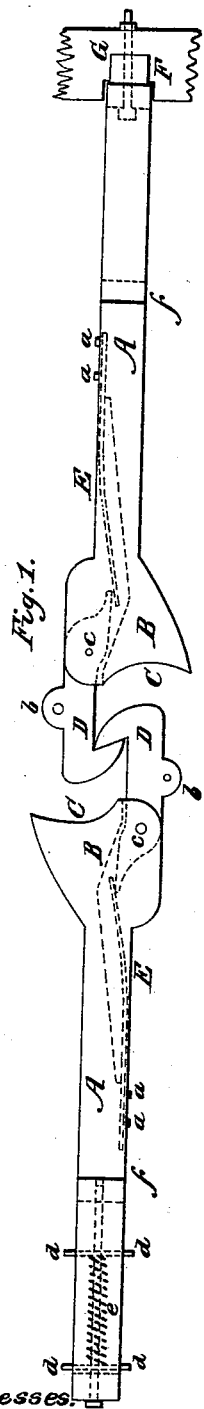
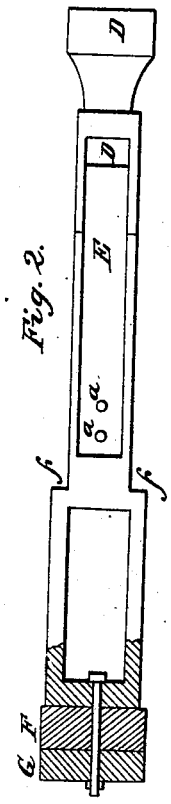
Witnesses:
John S. Riddle.
B. Barrett
Inventor.
Hazen Webster

UNITED STATES PATENT OFFICE.

HAZEN WEBSTER, OF ELGIN, ILLINOIS.

IMPROVEMENT IN CAR-COUPLINGS.

Specification forming part of Letters Patent No. 39,436, dated August 4, 1863.

*To all whom it may concern:*

Be it known that I, HAZEN WEBSTER, of Elgin, county of Kane, and State of Illinois, have invented certain new and useful Improvements in Self-Adjusting Car-Couplings; and I do hereby declare that the following is a full, clear, and exact description of the construction and operation of the same, reference being had to the annexed drawings, making a part of this specification, in which—

Figure 1 is a top view of two of them coupled together; Fig. 2, a vertical section of one.

Like letters refer to similar parts in all of the figures.

The nature of my invention consists in providing the head of a draw-bar constructed so as to be adapted to self-adjusting couplings with a lateral curved projection, so as to make the draw-bar operate also as a bumper, and in combining such curved projection with a coupling hook or catch.

To enable others skilled in the art to make and use my invention, I will proceed to describe its construction and operation.

The draw-bar A is made, with the exception of the head, in any of the known forms, and of any suitable material, and is attached to the car in the usual manner, as shown at G F or at *d e*. The head of the draw-bar, on the side opposite the hook, is provided with a lateral projection having its face curved, as shown at C. This projection is carried out somewhat in accordance with the size of the hook D, the object being to have the extreme point of the hook strike it a little outside of the center of the curve. By this arrangement the hook of a self-acting coupling is made to operate as a bumper without unlocking the cars, and the curve also assists the spring in holding the hook in place, and prevents the cars from uncoupling when on a down grade, where the most of the automatic couplings are found to fail, especially if the track is rough and uneven. The side of the draw-bar and head opposite the curve C are made open, so as to receive the hook D and spring E, as shown by the dotted lines in Fig. 1. The hook or catch D is made of iron, or other suitable material, and is made as shown at Fig. 1, and hinged or pivoted at *c* at the rear end. A spring, E, made of steel, and nearly straight is attached at *a a* for the purpose of operating the hook. The head of the hook D is made vertically about fourteen inches in width, so as to adapt it to different heights of cars and to prevent bounding apart on uneven tracks. This device is opened by attaching a chain to the projection *b* on the back of the hook D and connecting such chain with a windlass, lever, or by other suitable means, and when thus complete making a self-adjusting coupling, which I have found by experiments to operate successfully under all circumstances.

I do not claim as my invention the hook or catch D or spring E, as they appear to have been before known and used; but

What I claim as my invention, and desire to secure by Letters Patent, is—

The curved projection C, in combination with a hook or catch, D, so as to make the coupling operate also as a bumper, substantially as set forth and specified.

Done this 24th day of December, A. D. 1860.

HAZEN WEBSTER.

Witnesses:
B. BURRETT,
E. S. CHAPPELL.